(12) United States Patent
Kepler et al.

(10) Patent No.: US 7,367,629 B2
(45) Date of Patent: May 6, 2008

(54) ADJUSTABLE ATTACHMENT AND TENSIONING ASSEMBLY FOR THE SUSPENSION OF A SEAT ASSEMBLY

(75) Inventors: Brian Delane Kepler, Westland, MI (US); Christopher Welch, Pontiac, MI (US); Stephen Becker, Ypsilanti, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 144 days.

(21) Appl. No.: 10/514,515

(22) PCT Filed: May 15, 2003

(86) PCT No.: PCT/US03/15570

§ 371 (c)(1),
(2), (4) Date: Jun. 17, 2005

(87) PCT Pub. No.: WO03/097403

PCT Pub. Date: Nov. 27, 2003

(65) Prior Publication Data

US 2005/0242652 A1    Nov. 3, 2005

Related U.S. Application Data

(60) Provisional application No. 60/380,611, filed on May 15, 2002.

(51) Int. Cl.
*A47C 7/02* (2006.01)
*A47C 31/00* (2006.01)

(52) U.S. Cl. .......................... 297/452.13; 297/452.63; 297/218.5

(58) Field of Classification Search ........... 297/452.13, 297/452.15, 452.56, 452.63, 218.1, 218.3, 297/218.5

See application file for complete search history.

(56) References Cited

U.S. PATENT DOCUMENTS

| 1,242,960 | A | * | 10/1917 | McIntosh | ........................ | 5/223 |
| 1,987,921 | A | * | 1/1935 | Bertsch | ....................... | 160/378 |
| 2,448,860 | A | | 9/1948 | Collins | | |
| 2,615,178 | A | * | 10/1952 | Karg | .............................. | 5/210 |
| 2,692,010 | A | | 10/1954 | Christie | | |
| 2,832,398 | A | | 4/1958 | Liljengren | | |
| 2,843,195 | A | | 7/1958 | Barvaeus | | |
| 2,995,182 | A | * | 8/1961 | Hendrickson | ............. | 297/451.3 |
| 3,041,109 | A | * | 6/1962 | Eames et al. | ............. | 297/451.4 |

(Continued)

FOREIGN PATENT DOCUMENTS

AT     WO 92/17096     3/1992

(Continued)

*Primary Examiner*—Sarah B. McPartlin
(74) *Attorney, Agent, or Firm*—Clark Hill PLC

(57) ABSTRACT

A seat assembly for use in supporting an occupant in an automotive vehicle is provided, having a seat frame and a suspension material extending between and operatively secured to the seat frame for supporting the occupant of the seat assembly. A plurality of adjustment assemblies operatively couple the suspension material and the seat frame. Each adjustment assembly includes a stationary bracket secured to the seat frame and an adjustable attachment bracket operatively coupled to the stationary bracket. The suspension material is secured between the adjustable attachment bracket and the stationary bracket. The tension in select portions of the suspension material may be selectively adjusted in response to movement of the adjustable attachment bracket relative to the stationary bracket.

18 Claims, 4 Drawing Sheets

U.S. PATENT DOCUMENTS

| | | |
|---|---|---|
| 3,258,259 A | 6/1966 | Bohlin |
| 3,273,877 A | 9/1966 | Geller et al. |
| 3,289,220 A | 12/1966 | Grimshaw |
| 3,399,883 A | 9/1968 | McKey |
| 3,968,528 A * | 7/1976 | Poerink .................. 5/211 |
| 4,153,293 A | 5/1979 | Sheldon |
| 4,309,058 A | 1/1982 | Barley |
| 4,452,485 A | 6/1984 | Schuster |
| 4,462,635 A | 7/1984 | Lance |
| 4,545,614 A | 10/1985 | Abu-Isa et al. |
| 4,712,834 A | 12/1987 | Warrick |
| 4,858,992 A | 8/1989 | LaSota |
| 5,013,089 A | 5/1991 | Abu-Isa et al. |
| 5,022,709 A | 6/1991 | Marchino |
| 5,026,116 A | 6/1991 | Dal Monte |
| 5,058,952 A | 10/1991 | LaSota |
| 5,316,371 A | 5/1994 | Bishai |
| 5,641,205 A | 6/1997 | Schmidt |
| 5,797,652 A | 8/1998 | Darbyshire |
| 5,983,790 A * | 11/1999 | Switzer et al. ........... 101/127.1 |
| 6,030,040 A * | 2/2000 | Schmid et al. ........... 297/284.2 |
| 6,095,605 A | 8/2000 | Lai |
| 6,254,186 B1 | 7/2001 | Falzon |
| 6,309,018 B1 | 10/2001 | Jernstrom |
| 6,494,540 B1 * | 12/2002 | Tornero .................. 297/440.1 |
| 6,584,627 B1 * | 7/2003 | Yang ........................... 5/191 |
| 6,942,300 B2 * | 9/2005 | Numa et al. ........... 297/452.56 |
| 2001/0022458 A1 | 9/2001 | Kuster et al. |

FOREIGN PATENT DOCUMENTS

| | | |
|---|---|---|
| DE | 199 30 760 | 7/1999 |
| EP | 0 972 472 | 7/1998 |
| GB | 972051 | 5/1962 |

\* cited by examiner

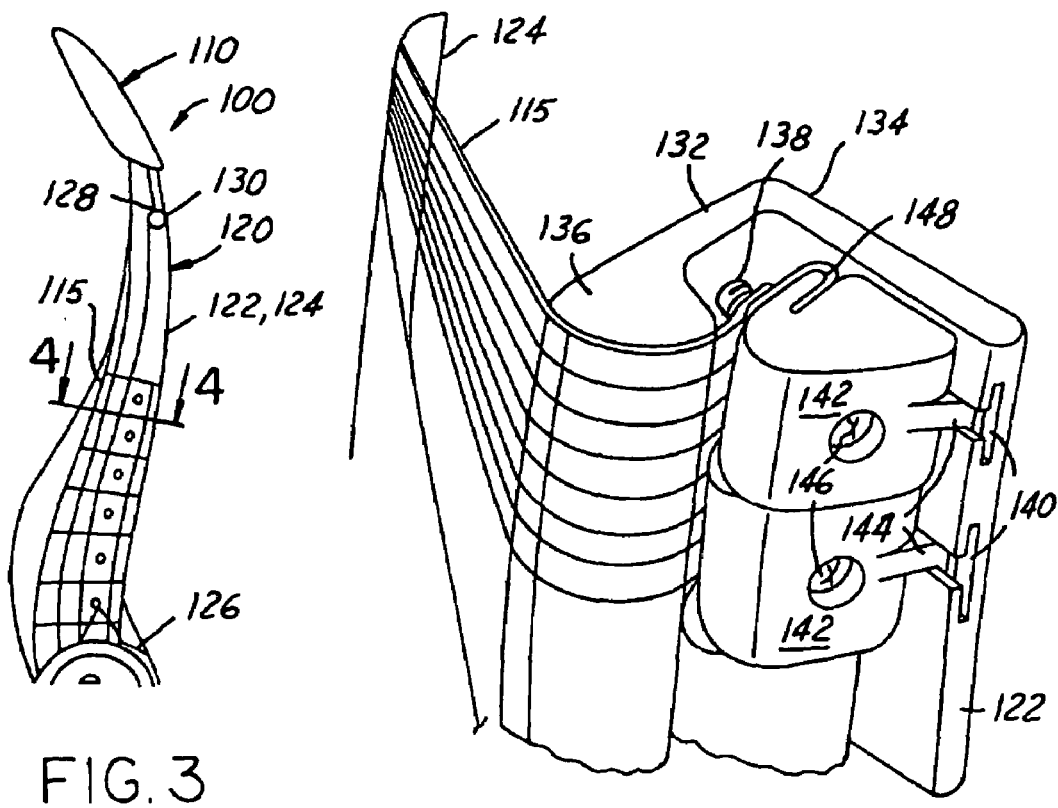
FIG. 3
FIG. 4
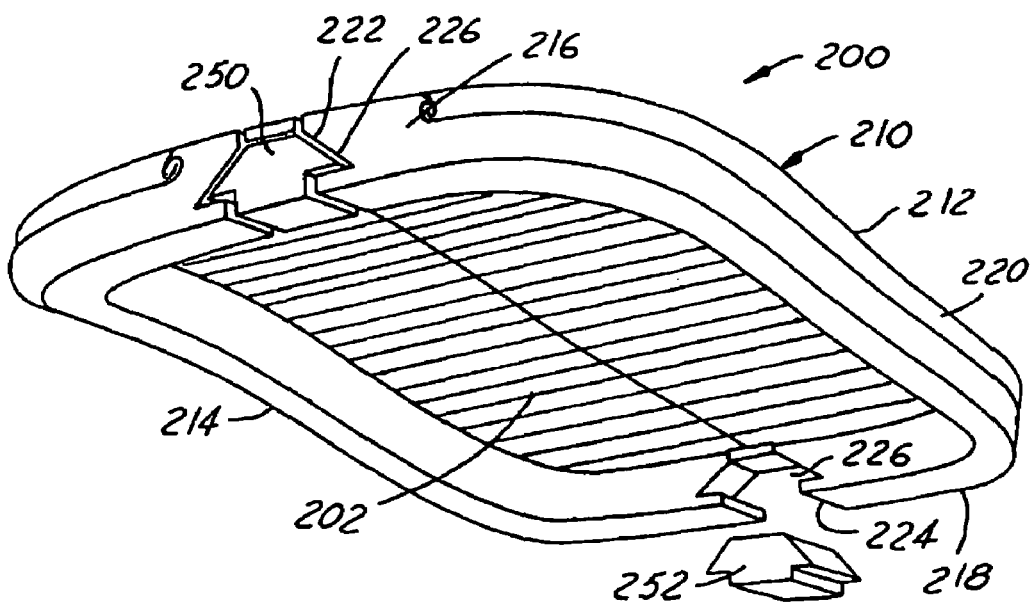
FIG. 7 understood# ADJUSTABLE ATTACHMENT AND TENSIONING ASSEMBLY FOR THE SUSPENSION OF A SEAT ASSEMBLY

RELATED APPLICATIONS

This application is a national stage of International Application No. PCT/US03/15570, filed May 15, 2003, and claims the benefit of Provisional Application No. 60/380,611 filed on May 15, 2002.

BACKGROUND OF THE INVENTION

1. Field of the Invention

The present invention relates to a seat assembly for an automotive vehicle, and more particularly, to a seat frame and an adjustable attachment and tensioning assembly for the suspension of a fabric material supported by the seat frame and a method of selectively tensioning portions of the fabric suspension to vary the seating characteristics for a particular occupant supported by the seat assembly.

2. Description of Related Art

Automotive vehicle seat assemblies often include adjustment or tensioning devices for adjusting the feel, shape, support or position of a specific portion of the seat assembly, such as the lumbar portion of the seat back. One example commonly referred to as "The Henderson" lumbar strap uses a tensioning strap to vary the amount of support for the occupant in the lower back region, or lumbar. However, an occupant is in contact with much more of the seating surface than just the lower back region, and therefore, the device is only partially effective and does not allow an occupant to selectively vary the tension of portions of the seat assembly. Furthermore, many current tensioning systems create a force on the seat frame causing the frame components to separate. Other problems include the potential for the suspended material to slip and lose its adjusted position and the difficulty of assembling a seat assembly with a pre-tensioned suspension material.

Accordingly, it remains desirable to provide an assembly that provides for selective tensioning control of portions of a seat assembly, allowing an occupant to fully customize a seat, without exerting force on the seat frame causing separation of the components. It is also desirable to provide an assembly that provides for a seat assembly that allows the suspension material to be attached to a seat frame and then later tensioned. Furthermore, it remains desirable to provide an assembly with a reduced number of components and an esthetic appeal.

SUMMARY OF THE INVENTION

According to one aspect of the invention, a seat assembly for use in supporting an occupant in an automotive vehicle comprising a seat frame having spaced apart side members and a suspension material extending between and operatively secured to the side members for supporting the occupant of said seat assembly. The invention further includes a plurality of adjustment assemblies operatively coupled between the suspension material and the seat frame and spaced apart along the side members, said adjustment assemblies including a stationary bracket fixedly secured to the frame and an adjustable attachment bracket operatively coupled to the stationary bracket, the suspension material is secured therebetween whereby the tension in discrete portions of the suspension material may be selectively adjusted in response to movement of the adjustable attachment bracket relative to the stationary bracket.

According to another aspect of the current invention, a seat assembly for use in supporting an occupant in an automotive vehicle comprising a seat frame having spaced apart side members, the side members are symmetrically opposite and generally C-shaped, having front portion terminating in a front end, a back portion terminating in a back end, and an elongated side portion extending between said front portion and said back portion and a suspension material extending between the side members for supporting the occupant of the seat assembly, the side members being adapted to fixedly secure said suspension material to the side members. The front portion and the back portion of each of said side members further includes a symmetrically opposite recessed area such a that when corresponding end sections of each of the side members are aligned, a front cavity and a back cavity of the same shape are formed. A front wedge and a back wedge for filling respective the cavity created by adjoining the side members, the wedges control the amount of separation between the side members and thereby affect the tension of the suspension material, thereby allowing the suspension material to be fixedly secured to the side members without any tension and then using said wedges to set the final amount of tension of the suspension material.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a side view of an alternative embodiment of a seat back frame with a suspension tensioning assembly;

FIG. 4 is an isometric sectional view taken along line 4-4 of FIG. 3;

FIG. 7 is an isometric view of yet another alternative embodiment of a seat cushion with a suspension tensioning assembly.

DETAILED DESCRIPTION OF THE PREFERRED EMBODIMENT

Figure 1:
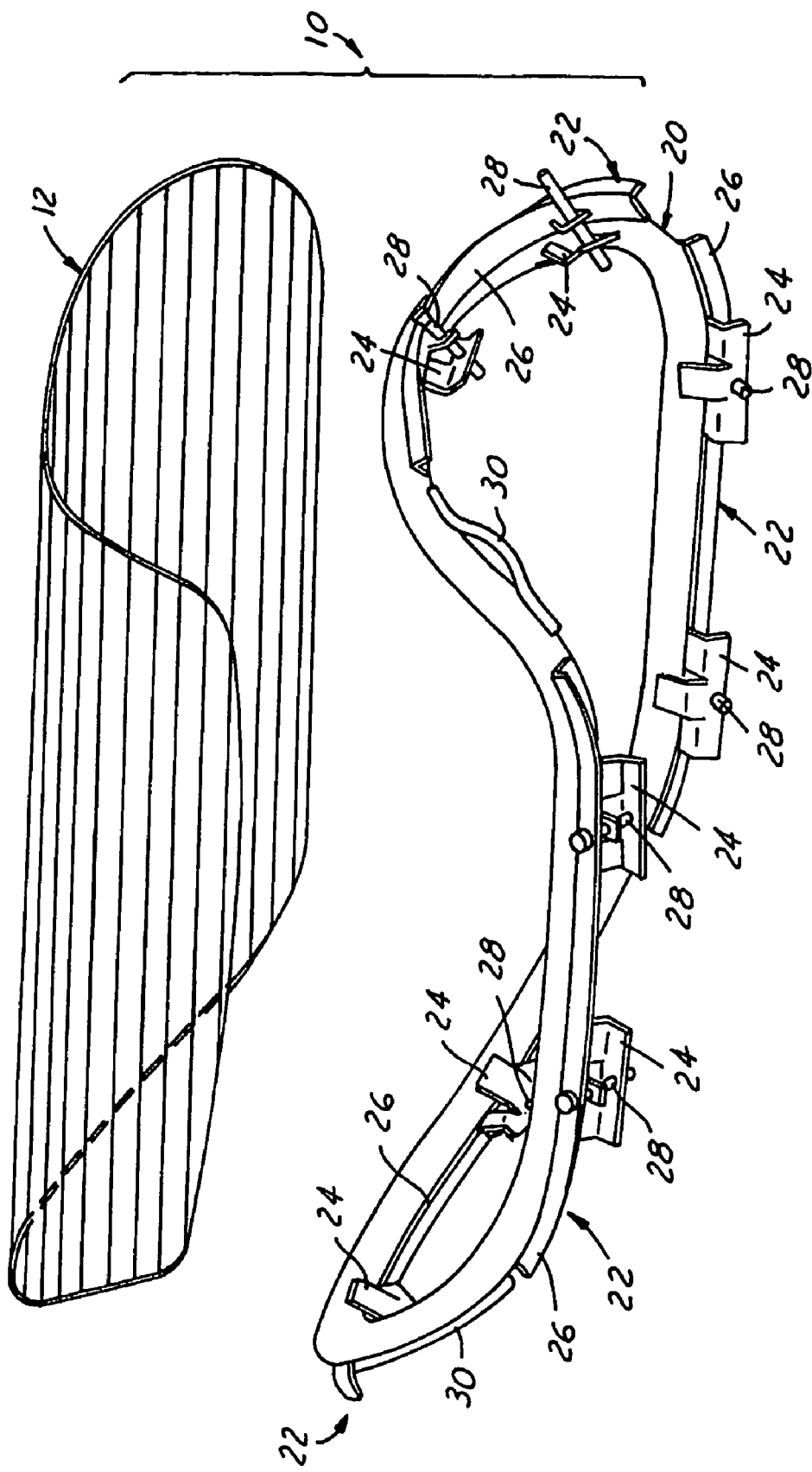
FIG. 1 is a partially exploded isometric view of a seat cushion frame with a suspension tensioning assembly.
Figure 2:
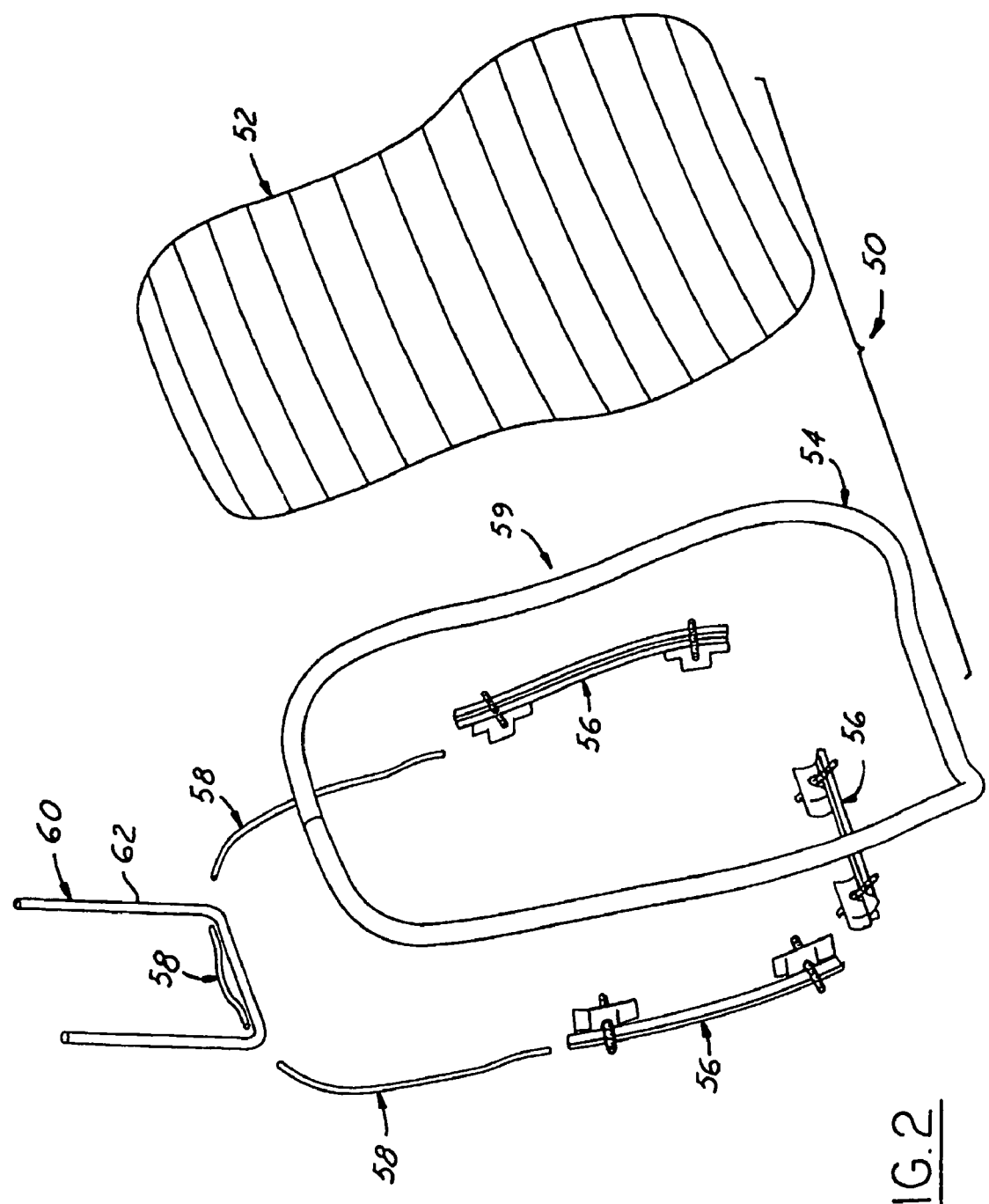
FIG. 2 is an exploded isometric view of a seat back frame with the suspension tensioning assembly.

Referring to FIG. 1, a seat cushion assembly for use in an automotive vehicle is generally shown at 10. The seat cushion assembly 10 comprises a mesh suspension material or mat 12 and a seat cushion frame 20. The seat cushion frame 20 comprises bent tubular steel, or similar material, such as to provide a contoured seating area when the mesh suspension material 12 is affixed to the seat cushion frame 20.

The seat cushion frame 20 includes a plurality of adjustment assemblies 22. The adjustment assemblies 22 include at least one stationary bracket 24 which is fixedly secured to the inside of the seat cushion frame 20 for providing support to an adjustable attachment bracket 26. The stationary brackets 24 and the attachment brackets 26 are adjustably interconnected by threaded fasteners 28, such as bolts, screws, or the like. Tightening the threaded fastener 28, or rotating it in a clockwise direction, causes the attachment bracket 26 to move towards the stationary bracket 24. Accordingly, loosening the threaded fastener 28, or rotating it in a counterclockwise direction, causes the attachment bracket to move away from the stationary bracket 24. This configuration eliminates any tendency of the adjusting force to separate the components of the seat cushion frame 20.

The suspension material 12 is fixedly secured to the attachment bracket 26, allowing the tension in the suspension material 12 to be adjusted as the attachment bracket 26 moves relative to the stationary bracket 24. Specifically, as the threaded fastener 28 is tightened and the attachment bracket 26 moves towards the stationary bracket 24, the tension of the suspension material 12 is increased in relation to the amount the threaded fastener 28 is tightened. Accordingly, as the threaded fastener 28 is loosened, the attachment bracket 26 moves away from the stationary bracket 24 and the tension of the suspension material 12 is released in relation to the amount the threaded fastener 28 is loosened. Furthermore, the seat cushion frame 20 includes a plurality of fixed attachment brackets 30 for fixedly securing the suspension material 12 to the frame 20 in areas for which no adjustment is required. The attachment bracket 26 is located far enough from the frame 20 such that the suspension material 12 may pass in between the frame 20 and the attachment bracket 26, thereby clamping the suspension material 12, or eliminating the need to pass any objects through the material 12 in order to achieve tension adjustment.

Referring to FIG. 3, an alternative embodiment of an automotive seat back assembly is shown at 100. The seat back assembly 100 includes a head restraint 110, suspension material 115, and a seat back frame 120. The head restraint 110 may be fixed or adjustable as is commonly known to one of ordinary skill in the art. The suspension material 115 is generally stretched along the seat back frame 120 so as to provide support and energy absorption for an occupant.

The seat back frame 120 includes two generally parallel side members 122, 124 extending from a first portion 126 to a second portion 128. The side members 122, 124 are interconnected by an upper crossbar 130 generally at the second portion 128. The upper cross bar 130 includes the head restraint 110.

Referring now to FIG. 4, the side members 122, 124 are mirror images and therefore, only side member 122 will be described. The side member 122 has a generally V-shaped cross section with one portion of the V section creating a front wall 132 that faces the center of the seat back frame 120, or the opposing side member 124, and the opposing V section creating an adjacent back wall 134. The front wall 132 includes a rounded area 136 located at the front outer edge of the seat back frame 120 for allowing the suspension material 115 at the edge of the seat back assembly 100 to have an esthetically pleasing smooth transitional surface. The front wall 132 further includes a plurality of threaded apertures 138. The back wall 134 includes a plurality of generally T-shaped slides 140 which are aligned in a lateral, cross-car direction and are generally aligned with the threaded apertures 138. The side member 122 further includes an adjustment assembly or adjustment block 142 operatively connected to one of the apertures 138 and T-shaped slides 140.

More specifically, the block 142 includes a threaded fastener 146 which is functionally engaged with the threaded aperture 138. The block 142 further includes a suspension attachment method 148, such as, a J-hook receptor or similar, as is commonly known to one of ordinary skill in the art to receive and hold a plastic or rigid rubber type "I" strip which has been strip sewn, heat staked, or molded at the perimeter of the suspension material 115, thereby operatively securing the suspension material 115 to the seat back frame 120. The adjustment block 142 further includes a preferably T-shaped flange 144 which is shaped to slidably engage within the slide 140 for allowing the block 142 to move laterally along the slide 140. There may be one or more blocks 142 utilized to make the suspension material 115 more taut in various areas in this manner.

One skilled in the art will realize that the tensioning device described above could be adapted for use with a seat cushion frame.

Figure 5:
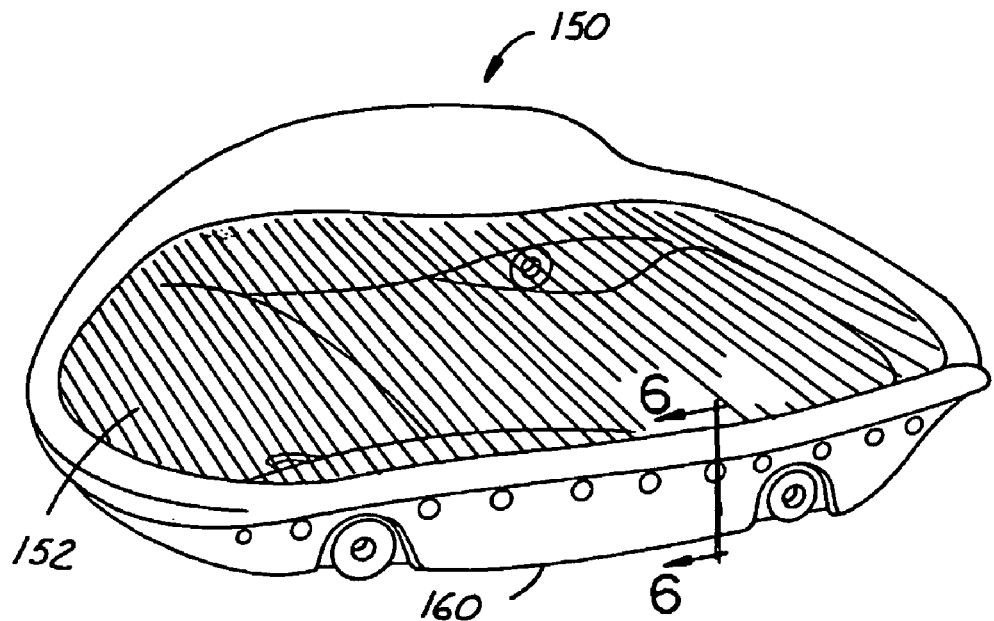
FIG. 5 is an isometric view of another alternative embodiment of a seat cushion with a suspension tensioning assembly.
Figure 6:
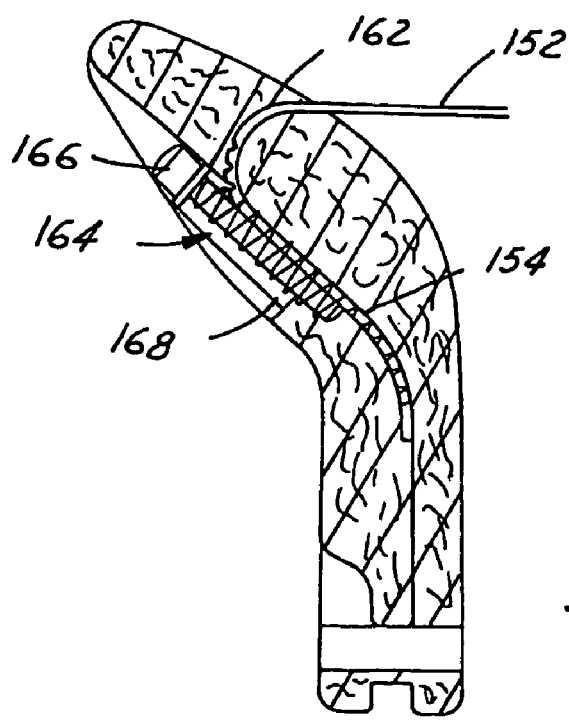
FIG. 6 is a sectional view taken along line 6-6 of FIG. 5.

Referring to FIG. 5, a second alternative embodiment of an automotive seat cushion is shown generally at 150. The seat cushion 150 includes a seat cushion frame 160 and a suspension material 152. The seat cushion frame 160 is for supporting an occupant, via the suspension material 152. Referring to FIG. 6, the suspension material 152 includes a plurality of adjustment straps 154. The adjustment straps 154 are preferably of a rubber or other flexible plastic-type material that is attached or heat staked or molded to the perimeter or terminal edges of the suspension material 152. The adjustment straps 154 further include a plurality of slots or depressions which are spaced to matingly engage with a threaded fastener 166.

The seat cushion frame 160 includes a plurality of suspension apertures 162 for allowing the suspension material 152 to be adjustably attached thereto. The seat cushion 160 further comprises a plurality of attachment assemblies 164, which are generally aligned with the suspension apertures 162, for adjusting the tension in the suspension material 152. The attachment assemblies 164 include a threaded fastener 166 for matingly engaging the adjustment strap 154 and a stationary bracket 168 for holding the fastener 166 in place.

In operation, the adjustment assemblies 164 are generally located around the seat cushion frame 160 in areas where adjustment of the suspension material 152 is desired. An adjustment strap 154 is passed through a suspension aperture 162 where the adjustment strap 154 matingly engages with a fastening member 166. Upon a tightening rotation of the fastening member 166 the engagement with the adjustment strap 154 causes the suspension material 152 to be pulled taut, thereby increasing the amount of tension. Upon a loosening rotation of the fastening member 166, the suspension material 152 is pushed out from the suspension aperture 162, causing the amount of tension of the suspension material 152 to be released.

One skilled in the art will realize that the tensioning device described above could be adapted for use with a seat back frame.

Referring to FIG. 7, yet another alternative embodiment of an automotive seat cushion is shown generally at 200. The seat cushion 200 comprises a suspension material 202 and a cushion frame 210.

The cushion frame 210 includes spaced apart side members 212, 214 and front and back wedges 250, 252. The side members 212, 214 are symmetrically opposite and, therefore, only side member 212 will be discussed. The side member 212 is generally C-shaped, having front and rear portions 216, 218 and an elongated side portion 220. Each portion 216, 218, 220 includes an attachment method for securely attaching the suspension material 202 thereto, such as using a J-strip or any other method common in the art. The front and rear portions 216, 218, each include an end section 222, 224. The end sections 222, 224 include a recessed area 226, such that when the end sections 222, 224 of the side members 212, 214 are aligned, two openings capable of receiving the front and back wedges 250, 252 are formed.

The front and back wedges 250, 252 are shaped to fill the void created between the side members 212, 214 and to control or modify the amount of separation between the end sections 222, 224 of the side members 212, 214 when positioned therebetween.

In operation, the suspension material 202 is securely attached to each side member 212, 214. The end sections 222, 224 of the side members 212, 214 are then aligned so that the recessed area 226 of the end sections 222, 224 create an opening the shape of the front and back wedges 250, 252. The front and back wedges 250, 252 are then inserted or snapped into the end sections 222, 224 so as to fill the recessed area 226 and to space apart the side members 212, 214 creating a desired amount of tension in the suspension material 202. Accordingly, the size of the wedges 250, 252 may be modified to adjust the amount of space in between the side members 212, 214 thereby adjusting the amount of tension of the suspension material 202. This tensioning device allows for easier installation of the suspension material 202 onto the cushion frame 210 as the material 202 may be attached to the side members 212, 214 in a pretension state and then put into a tensioned state by use of the wedges 250, 252.

One skilled in the art will realize that the tensioning device described above could be adapted for use with a seat back frame.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A seat assembly for use in supporting an occupant in an automotive vehicle comprising:
   a seat frame having spaced apart side members;
   a suspension material extending between and operatively secured to said side members for supporting the occupant of said seat assembly;
   a plurality of adjustment assemblies operatively coupling said suspension material and said seat frame and spaced apart along said side members, each of said adjustment assemblies including a stationary bracket fixedly secured to said frame, an adjustable attachment bracket operatively coupled to said stationary bracket, and a threaded fastening member extending through said adjustable attachment bracket and threadably engaging said stationary bracket, said suspension material is fixedly secured to said adjustable attachment bracket whereby a tightening rotation of said fastening member will move said adjustable attachment bracket closer to said stationary bracket, thereby increasing the tension of a select portion of said suspension material in relation to the amount of rotation of said fastening member and a loosening rotation of said fastening member will move said adjustable attachment bracket away from said stationary bracket, thereby releasing the tension of a select portion of said suspension material in relation to the amount of rotation of said fastening member; and wherein each of said plurality of adjustment assemblies further includes a plurality of fastening members having helical threads, each of said fastening members extending through said adjustable attachment bracket and threadably engaging said stationary bracket of said adjustment assemblies for use in adjustably tensioning select portions of said suspension material.

2. A seat assembly as set forth in claim 1, wherein said seat assembly further includes a plurality of fixed attachment brackets fixedly secured to said seat frame for fixedly securing said suspension material to said seat frame in select areas in which no tension adjustment of said suspension material is desired.

3. A seat assembly as set forth in claim 2, wherein said seat frame of said seat assembly further includes a seat back frame for supporting the back of the occupant of said seat assembly and a seat bottom frame for supporting the weight of the occupant of said seat assembly, said seat back frame further including a head restraint support fixedly secured to said seat back frame for supporting the head of the occupant of said seat assembly.

4. A seat assembly for use in supporting an occupant in an automotive vehicle comprising:
   a seat frame including spaced apart side members wherein each of said side members has a substantially V-shaped cross-section thereby defining a front wall facing an opposite said side member and an adjacent back wall, said front wall having a plurality of threaded apertures therein, said front wall and said back wall further defining a V-shaped area therebetween;
   a suspension material extending between and operatively secured to said side members for supporting the occupant of said seat assembly; and
   a plurality of adjustment assemblies operatively coupling said suspension material and said seat frame and spaced apart along said side members, each of said adjustment assemblies including an adjustment block and a threaded fastening member extending through said adjustment block and threadably engaging one of said plurality of threaded apertures thereby adjustably securing said adjustment block to said front wall of said side member, said suspension material is fixedly secured to said adjustment block whereby a tightening rotation of said fastening member will move said adjustment block closer to said front wall, thereby increasing the tension of a select portion of said suspension material in relation to the amount of rotation of said fastening member and a loosening rotation of said fastening member will move said adjustment block away from said front wall, thereby releasing the tension of a select portion of said suspension material in relation to the amount of rotation of said fastening member.

5. A seat assembly as set forth in claim 4, wherein said front wall has a rounded area for allowing said suspension material to have a smooth transitional surface around an edge of said seat assembly.

6. A seat assembly as set forth in claim 5, wherein said adjustment blocks are adjustably secured to each of said side members and within said V-shaped area of said side members.

7. A seat assembly as set forth in claim 6, wherein said back wall includes a plurality of elongated slides generally aligned with said threaded apertures in said front wall, for slidably supporting said adjustment blocks.

8. A seat assembly as set forth in claim 7, wherein said adjustment block is adjustably secured to both of said front wall and said back wall of said side member for use in adjustably tensioning select portions of said suspension material.

9. A seat assembly as set forth in claim 8, wherein said suspension material has at least two opposite terminal edges generally aligned with respective said side members for fixedly securing said suspension material to said seat assembly.

10. A seat assembly as set forth in claim 9, wherein each of said adjustment blocks includes a suspension material receptor for fixedly securing a portion of said terminal edge of said suspension material thereto.

11. A seat assembly as set forth in claim 10, wherein each of said adjustment blocks further includes a flange for slidably engaging with one of said plurality of slides of said back wall of said side member, for slidably securing said adjustment block to said back wall of said side member and allowing said adjustment block to slide laterally inward toward said front wall upon tightening of said fastening member thereby resulting in the increase of tension of select portions of said suspension material and allowing said adjustment block to slide laterally outward away from said front wall upon loosening of said fastening member thereby resulting in the release of tension of select portions of said suspension material.

12. A seat assembly as set forth in claim 11, wherein each of said plurality of slides is substantially T-shaped.

13. A seat assembly as set forth in claim 12, wherein said flange of said adjustment block is substantially T-shaped.

14. A seat assembly as set forth in claim 13, wherein said seat frame of said seat assembly further includes a seat back frame for supporting the back of the occupant of said seat assembly and a seat bottom frame for supporting the weight of the occupant of said seat assembly, said side members of said seat back frame are interconnected by a crossbar.

15. A seat assembly as set forth in claim 14, wherein said seat frame of said seat assembly further includes a head restraint support fixedly secured to said crossbar for supporting the head of the occupant of said seat assembly.

16. A seat assembly for use in supporting an occupant in an automotive vehicle comprising:
a seat frame having spaced apart side members, said side members are symmetrically opposite and generally C-shaped, having a front portion terminating in a front end, a back portion terminating in a back end, and an elongated side portion extending between said front portion and said back portion;
a suspension material extending between said side members for supporting the occupant of said seat assembly, said side members being adapted to fixedly secure said suspension material to said side members;
said front portion and said back portion of each of said side members further including a symmetrically opposite recessed area such that when corresponding said end sections of each of said side members are aligned, a front cavity and a back cavity of the same shape are formed; and
a front wedge and a back wedge for filling respectively said front and back cavities created by adjoining said side members, said wedges control the amount of separation between said side members and thereby affect the tension of said suspension material, thereby allowing said suspension material to be fixedly secured to said side members without any tension and then using said wedges to set the final amount of tension of said suspension material.

17. A seat assembly for use in supporting an occupant in an automotive vehicle comprising:
a seat frame having spaced apart side members;
a suspension material extending between and operatively secured to said side members for supporting the occupant of said seat assembly, said suspension material including at least two opposite terminal edges generally aligned with respective said side members and each of said terminal edges having a plurality of flexible adjustment straps including a plurality of spaced slots; and
a plurality of adjustment assemblies operatively coupling said suspension material and said seat frame and spaced apart along said side members, each of said adjustment assemblies including a stationary bracket fixedly secured to said frame and a threaded fastening member matingly engaging said plurality of spaced slots of one of said plurality of flexible adjustment straps and said stationary bracket, whereby a tightening rotation of said fastening member causes said suspension material to be pulled taut, thereby increasing the tension of a select portion of said suspension material in relation to the amount of rotation of said fastening member and a loosening rotation of said fastening member causes said suspension material to be pushed out, thereby releasing the tension of a select portion of said suspension material in relation to the amount of rotation of said fastening member.

18. A seat assembly as set forth in claim 17, wherein each of said side members includes a plurality of suspension apertures generally aligned with said adjustment assemblies for allowing corresponding said adjustment strap of said suspension material to pass therethrough and matingly engage with said threaded fastening member.

* * * * *